(12) United States Patent
Friesen

(10) Patent No.: US 9,975,712 B2
(45) Date of Patent: May 22, 2018

(54) PORTABLE DRIVE-OVER CONVEYOR SYSTEM USABLE FOR UNLOADING BELLY DUMP TRUCKS WITH MULTIPLE DISCHARGES AND FOR SIMULTANEOUSLY UNLOADING MORE THAN ONE TRUCK

(71) Applicant: FB Industries Inc., Winkler, CA (US)

(72) Inventor: Henry Friesen, Winkler (CA)

(73) Assignee: FB Industries Inc., Winkler, CA (US)

( * ) Notice: Subject to any disclaimer, the term of this patent is extended or adjusted under 35 U.S.C. 154(b) by 123 days.

(21) Appl. No.: 15/130,201

(22) Filed: Apr. 15, 2016

(65) Prior Publication Data

US 2017/0297834 A1  Oct. 19, 2017

(51) Int. Cl.
*B65G 67/24* (2006.01)
*B60P 1/36* (2006.01)

(52) U.S. Cl.
CPC .............. *B65G 67/24* (2013.01); *B60P 1/36* (2013.01)

(58) Field of Classification Search
CPC .................................................... B65G 67/24
USPC ........................................ 414/376, 573, 574
See application file for complete search history.

(56) References Cited

U.S. PATENT DOCUMENTS

| | | | | |
|---|---|---|---|---|
| 3,606,050 A | * | 9/1971 | Silver | B65G 69/30 198/607 |
| 4,701,095 A | * | 10/1987 | Berryman | B65D 88/30 198/311 |
| 5,297,914 A | * | 3/1994 | Ash | B65G 67/24 180/298 |
| 5,785,481 A | * | 7/1998 | Ockels | B60P 1/42 222/1 |
| 5,964,566 A | * | 10/1999 | Stewart | B65G 67/24 198/302 |
| 6,966,740 B2 | * | 11/2005 | Mast | B65G 47/18 414/537 |
| 7,090,066 B2 | * | 8/2006 | Kirsch | B65G 47/18 198/302 |
| 7,424,943 B2 | * | 9/2008 | Gausman | B65G 67/24 198/311 |
| 2010/0135758 A1 | * | 6/2010 | Gallione | B60P 1/36 414/505 |
| 2012/0219391 A1 | * | 8/2012 | Teichrob | B65G 63/008 414/293 |
| 2013/0233682 A1 | * | 9/2013 | Werlinger | B65G 21/10 198/861.2 |

(Continued)

*Primary Examiner* — James Keenan
(74) *Attorney, Agent, or Firm* — Adrian D. Battison; Ade & Company Inc.; Kyle R. Satterthwait

(57) ABSTRACT

A portable drive-over conveyor is provided with a plurality of inlets and first and second conveyors so as to be arranged for simultaneously unloading multiple trucks side by side. Furthermore, the portable drive-over conveyor may be used in a system with another such drive-over conveyor in parallel to unload a truck having multiple discharges at each of the discharges by forming a bridge in between center structures of the drive-over conveyors allowing the truck to cross over the side by side drive-over conveyors and position the multiple discharges over the inlets of the side by side conveyors. Moreover, the second conveyor is swivably mountable on a frame of the drive-over conveyor such that particulate material is dischargeable at different locations angularly of a longitudinal axis of the trailer.

13 Claims, 12 Drawing Sheets

(56) References Cited

U.S. PATENT DOCUMENTS

2015/0044004 A1* 2/2015 Pham .................... B65D 88/32
                                                    414/332
2016/0052732 A1* 2/2016 Toews .................... B65G 47/18
                                                    198/302

* cited by examiner

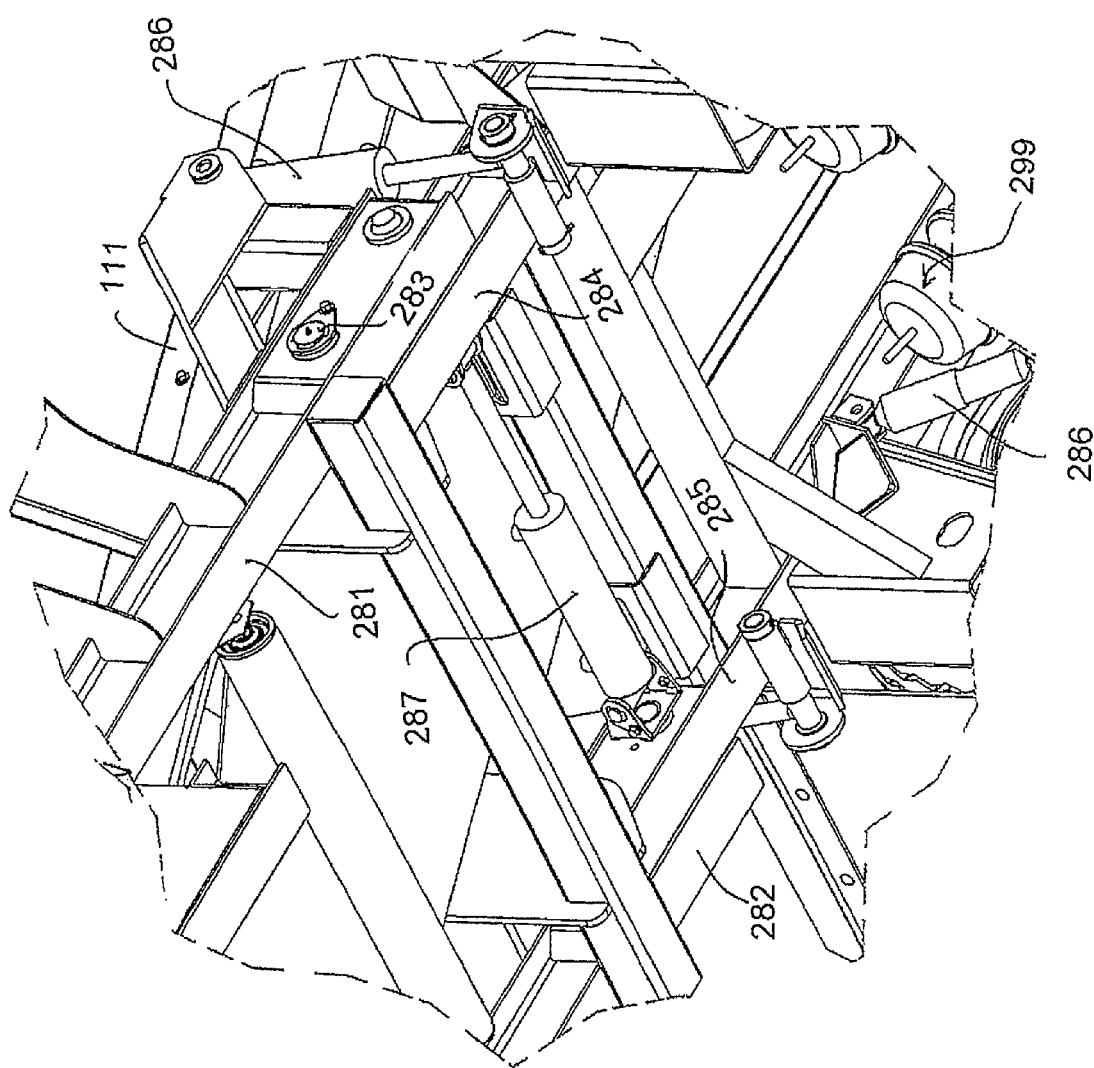

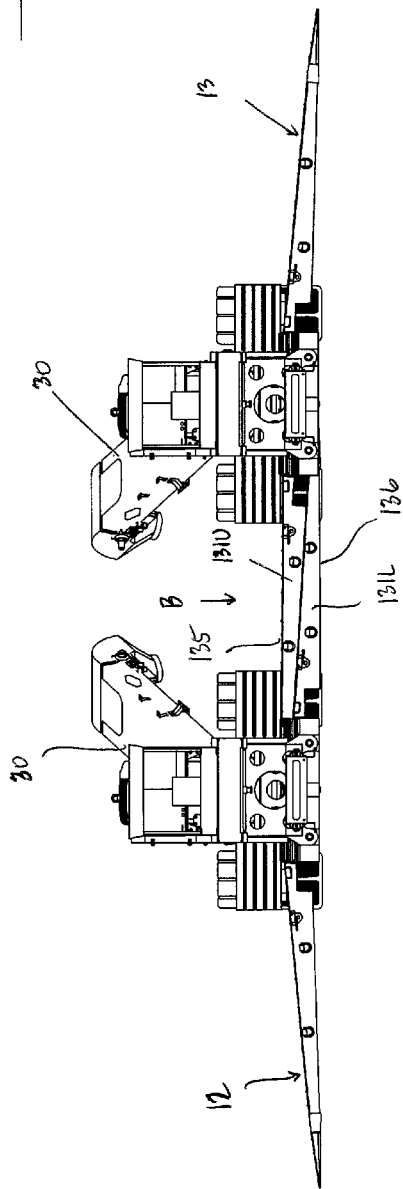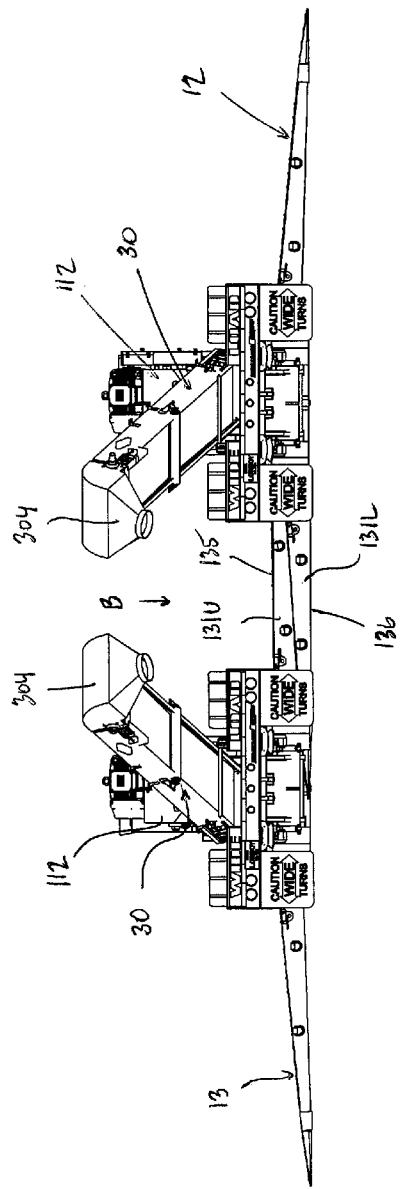

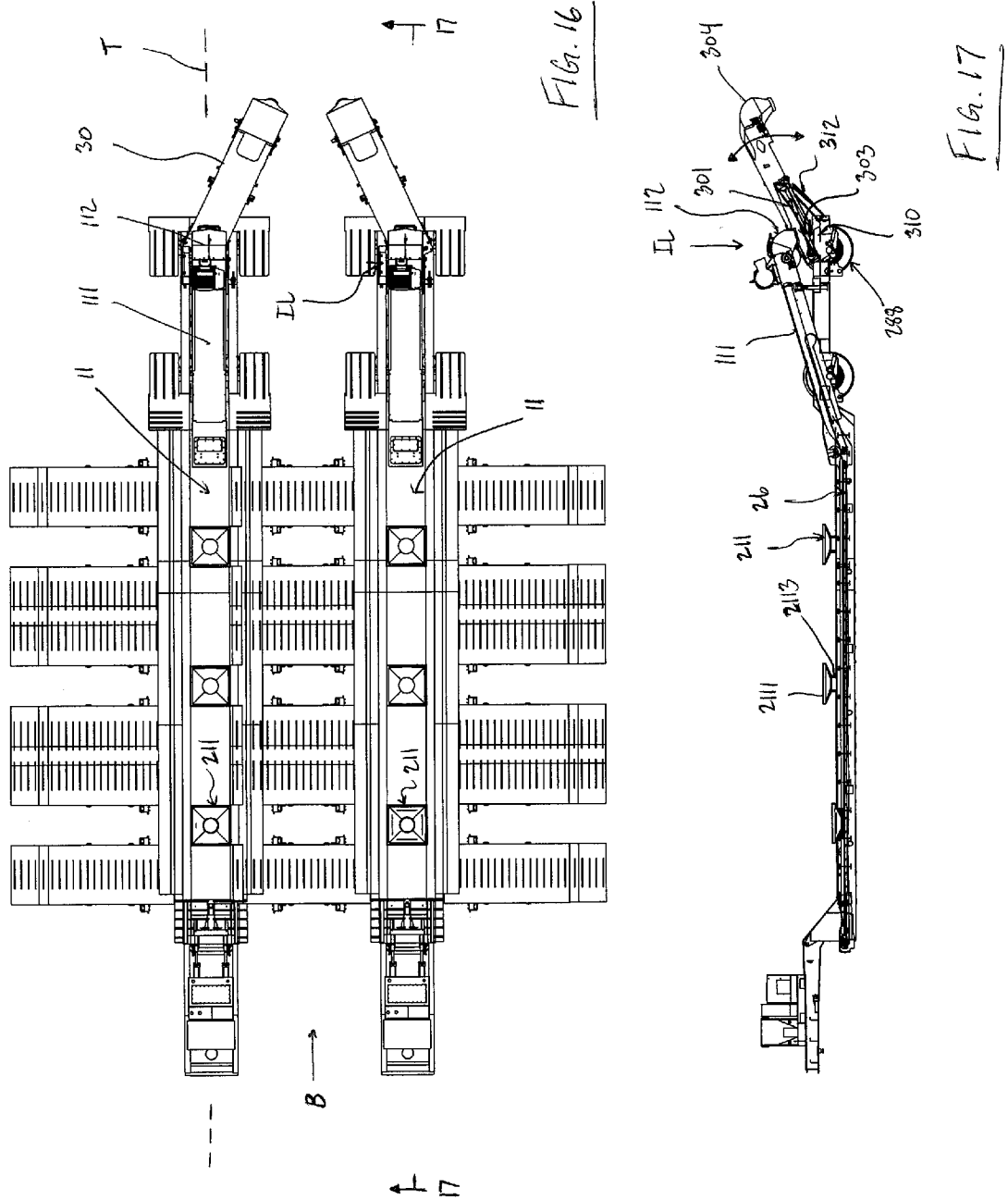

PORTABLE DRIVE-OVER CONVEYOR SYSTEM USABLE FOR UNLOADING BELLY DUMP TRUCKS WITH MULTIPLE DISCHARGES AND FOR SIMULTANEOUSLY UNLOADING MORE THAN ONE TRUCK

FIELD OF THE INVENTION

The present invention relates to a portable drive-over conveyor for unloading trucks.

BACKGROUND

A number of portable drive-over conveyors are presently provided by various manufacturers which can be used to unload a dump truck of its particulate material contents, for example aggregate.

These portable drive-over conveyors are particularly suited for use in a manner accommodating only dump trucks with a single discharge whether it be of the end dump or belly dump/bottom dump style, and thus only such use may have been contemplated therefor. As such, dump trucks having multiple discharges (typically of the belly dump style) require more time to unload their contents using the forgoing drive-over conveyors as this unloading process is likely to include one of (i) positioning each discharge one at a time over the portable drive-over conveyor, or (ii) discharging all contents through a single discharge.

Furthermore, such presently available portable drive-over conveyors are particularly suited for use in a manner accommodating only one dump truck at a time for unloading, so a series of dump trucks collectively transporting particulate material are required to be unloaded sequentially of one another thereby significantly increasing the duration of the unloading operation.

It thus may be desirable to have a system for unloading trucks which have multiple discharges, and that may also be suitable for unloading two or more trucks simultaneously.

SUMMARY OF THE INVENTION

According to one aspect of the invention there is provided a method for unloading particulate material from trucks having a plurality of discharges at longitudinally spaced positions therealong comprising:

providing at least two portable drive-over conveyors respectively comprising:

a trailer including a center frame structure with forward and rearward ends and first and second sides;

the trailer including a hitch coupling arranged at the forward end of the center frame structure for coupling to a towing vehicle;

the trailer including a wheel and axle assembly arranged at the rearward end such that the trailer is towable across a support surface by the towing vehicle;

a first ramp assembly mounted on the first side for pivotal movement about an axis longitudinal of the first side such that the first ramp assembly is positionable in a manner extending outwardly from the first side to define a ramp allowing a truck wheel to move onto the center frame structure from another surface;

a second ramp assembly mounted on the second side for pivotal movement about an axis longitudinal of the second side such that the second ramp assembly is positionable in a manner extending outwardly from the second side to define a ramp allowing a truck wheel to move onto the center frame structure from another surface;

a conveyor arranged along the center frame structure and arranged to transport the particulate material longitudinally along the trailer to a discharge at one end of the center frame structure;

the ramp assemblies and the center frame structure providing upper surfaces for supporting the truck as it passes from the first ramp assembly over the center frame structure and onto the second ramp assembly;

the upper surface of the center frame structure having an inlet for passage of the particulate material discharged thereon through the upper surface to the conveyor;

arranging said at least two portable drive-over conveyors such that one of the sides of a first one of the portable drive-over conveyors is facing one of the sides of a second one of the portable drive-over conveyors;

positioning one of the ramp assemblies of each of the portable drive-over conveyors in an overlapping configuration with one ramp assembly disposed on top of the other so as to form a bridge allowing a truck wheel to cross from the center frame structure of one portable drive-over conveyor to the other;

arranging a truck to pass over said at least two portable drive-over conveyors such that respective discharges of the truck are arranged over the inlet of each portable drive-over conveyor for discharging the particulate material to the conveyors;

and transporting the particulate material along the conveyors to another location beyond the portable drive-over conveyors.

This system thus provides at least two trailers each with two sets of ramp assemblies for moving to and from a respective unload point of the respective portable drive-over conveyor.

The portable drive-over conveyors may thus be operated in parallel to simultaneously unload a truck at each one of its multiple discharges.

Typically the portable drive-over conveyors are arranged spaced apart so that a distance between their inlets is in the order of spacing between the discharges of the truck.

Another important independent optional feature is that the inlet of at least one of the portable drive-over conveyors includes a funnel structure and a neck extending downwardly from a bottom of the funnel structure such that the funnel structure is arranged for raising above the upper surface of the center frame structure towards the respective discharge of the truck located thereover.

The raising funnel structure may thus be positioned closer to the respective discharge of the truck so as to capture as close to all of the particulate material discharged therefrom.

In one arrangement the conveyor of at least one of the portable drive-over conveyor includes a first portion extending longitudinally of the trailer from the inlet to an intermediary location spaced rearwardly of the inlet and a second portion extending from the intermediary location to the discharge of the conveyor that is located beyond the trailer.

Another important independent optional feature is that the second portion is arranged for swiveling movement about an upstanding axis such that the discharge of the conveyor is positionable to either side of a central axis longitudinal of the trailer.

Another important independent optional feature is that the second portion is positionable from a working position locating the discharge of the conveyor beyond the trailer to a transport position where the second portion lies within a perimeter of the trailer.

In one arrangement the conveyors feed the particulate material directly to a common location.

Another important independent optional feature is that there is provided a plurality of the inlets on the portable drive-over conveyors so that a plurality of trucks are unloadable in parallel.

The truck may be a belly dump truck.

According to one aspect of the invention there is provided a portable drive-over conveyor for unloading particulate material from trucks comprising:

a trailer having a frame structure with front and rear ends opposite one another on a trailer axis and first and second sides spanning between the forward and rear ends longitudinally of said trailer axis where the front end, rear end, left side, and right side collectively define a periphery of the frame;

the trailer including a hitch coupling supported at the front end of the frame structure for coupling to a towing vehicle;

the trailer including a plurality of wheels rotatably coupled at the rear end of the frame structure such that the trailer is towable across a support surface by the towing vehicle;

a conveyor carried by the frame structure and extending longitudinally of the trailer axis from one end to another end of the trailer;

the conveyor being arranged to transport particulate material to a discharge at one end of the trailer;

a first ramp assembly mounted on the first side for pivotal movement about an axis longitudinal of the first side such that the first ramp assembly is positionable in a manner extending outwardly from the first side to define a ramp allowing a truck wheel to move onto the frame structure from another surface;

a second ramp assembly mounted on the second side for pivotal movement about an axis longitudinal of the second side such that the second ramp assembly is positionable in a manner extending outwardly from the second side to define a ramp allowing a truck wheel to move onto the frame structure from another surface;

the ramp assemblies and the frame structure providing upper surfaces for supporting the truck as it passes from the first ramp assembly over the frame structure and onto the second ramp assembly;

the upper surface of the frame structure including a plurality of inlets at longitudinally spaced positions for passage of the particulate material discharged thereon through the upper surface to the conveyor.

A single such portable drive-over conveyor may by itself be used to unload two or more trucks side by side.

Another important independent optional feature is that the ramp assemblies each include a pair of ramp members arranged in spaced configuration in front of and to the rear of each inlet, and the ramp members immediately adjacent to one another but belonging to different pairs are unitary.

Another important independent optional feature is that the conveyor includes a first conveyor portion which is fed by the plurality of inlets and which extends rearwardly of a rearmost one of the inlets to an intermediary location, and a second conveyor portion extending from the intermediary location to the discharge of the conveyor.

As such, the second conveyor portion is typically fed by the first conveyor portion which at the intermediary location has a discharge positionable over an inlet of the second conveyor portion.

Another important independent optional feature is that the second conveyor portion is swivably attached to the frame structure so as to be swivably movable about an upstanding axis such that the discharge of the conveyor is locatable to either side of the trailer axis.

Another important independent optional feature is that the second conveyor portion is positionable in a working position where the discharge of the conveyor is located beyond the periphery of the trailer and in a transport position where the second conveyor portion lies within the periphery of the trailer.

In one arrangement, in the transport position the second conveyor portion is disposed above the first conveyor portion where the second conveyor portion is inoperable for receiving the particulate material transferred by the first conveyor portion.

BRIEF DESCRIPTION OF THE DRAWINGS

One embodiment of the invention will now be described in conjunction with the accompanying drawings in which:

FIG. 9 is an isometric view from underneath of the rear section only of the portion of FIG. 3.

FIG. 13 is a front elevational view of the pair of the portable drive-over conveyors of FIG. 12.

FIG. 14 is a rear elevational view of the pair of the portable drive-over conveyors of FIG. 12.

FIG. 16 is a top plan view of the pair of the portable drive-over conveyors of FIG. 12.

FIG. 17 is a cross-sectional view along line 17-17 in FIG. 16.

In the drawings like characters of reference indicate corresponding parts in the different figures.

DETAILED DESCRIPTION

The figures show a novel portable drive-over conveyor 1 which is suited for transferring particulate material, such as aggregate, salt, grain, and fertilizer, that is unloaded from a dump truck (not shown) and moved from the truck to another location in proximity to the portable drive-over conveyor. For example, this other location may comprise an open area adjacent the portable drive-over conveyor such that the particulate material is simply unloaded into an uncontained stockpile, or this other location may comprise for example a hopper H of another conveyor further transferring the particulate material to a barge, ship, rail car, another trailer, bin, silo, or indoor bulk storage facility. As will be better appreciated shortly hereinafter, the portable-drive over conveyor 1 is designed particularly for simultaneously unloading a plurality of trucks side by side.

Figure 12:
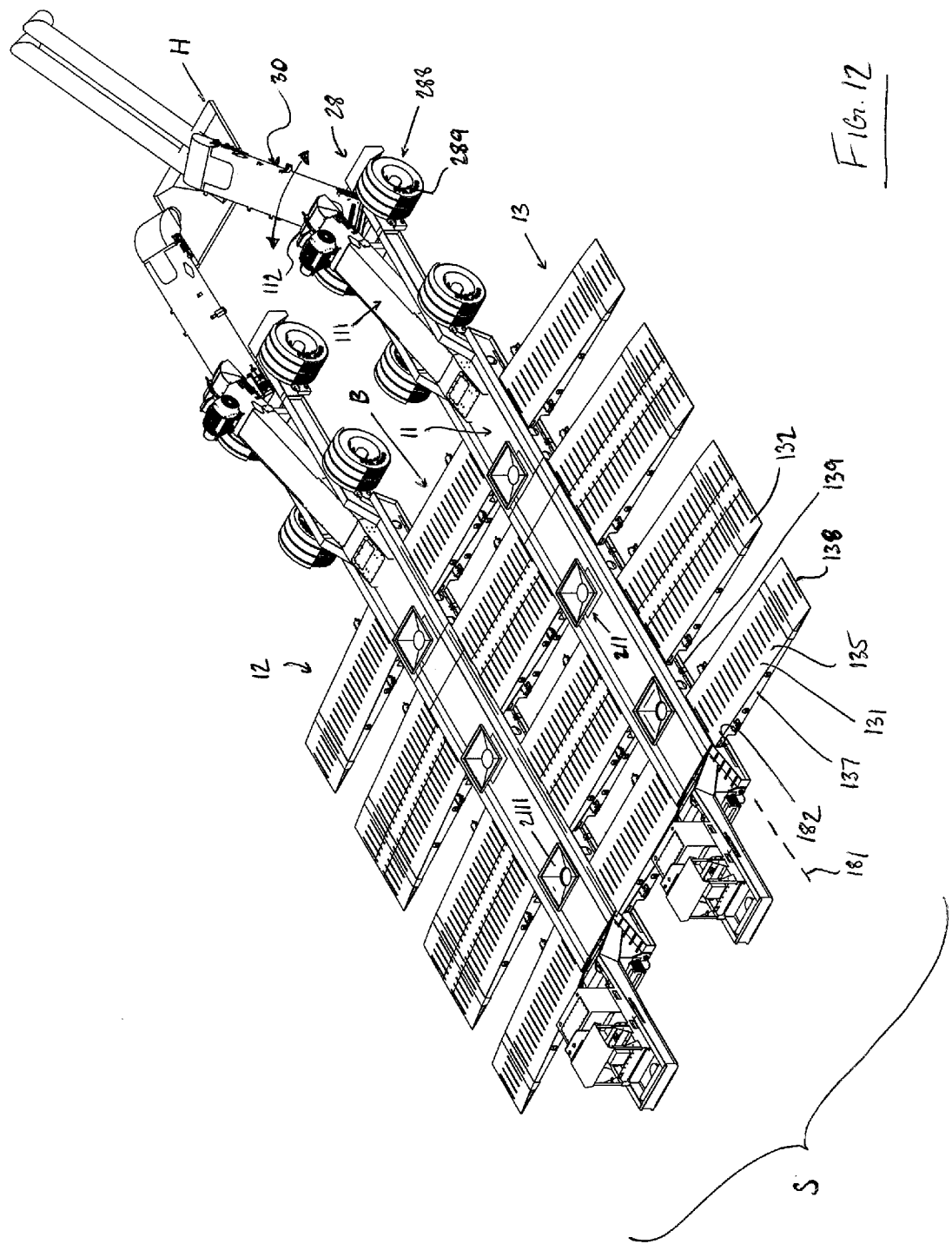
FIG. 12 is an isometric view of a pair of the portable drive-over conveyors according to the present invention that shows a cooperative operating position of the pair.
Figure 15:
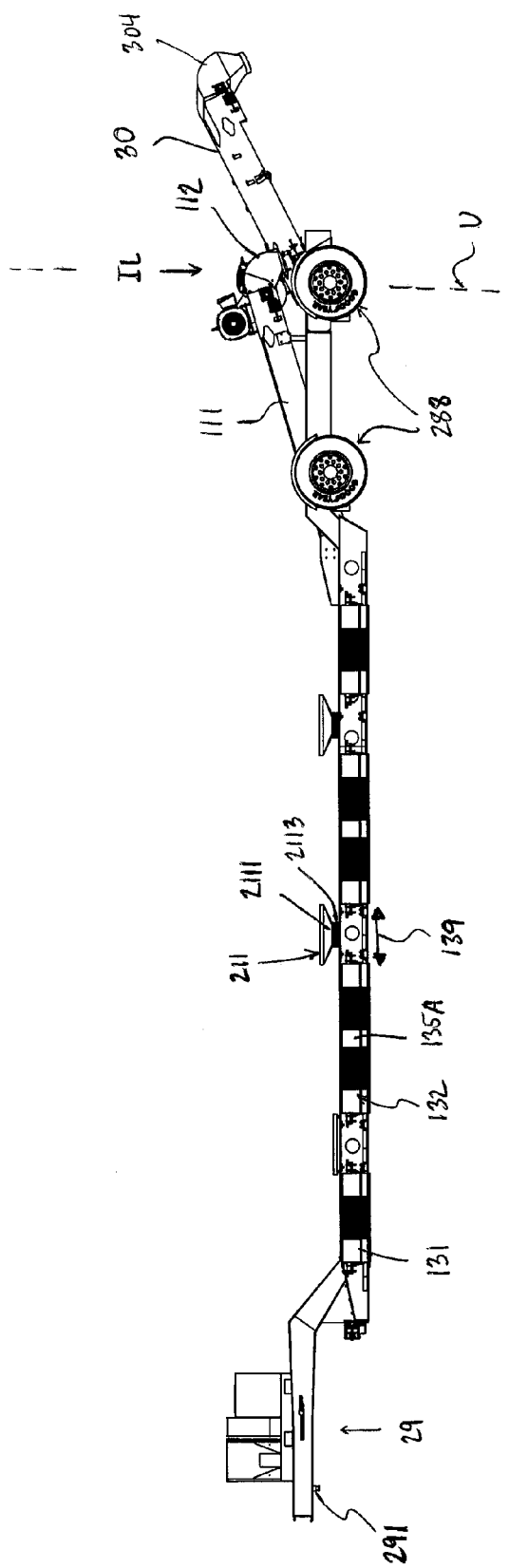
FIG. 15 is a side elevational view from one side of the pair of the portable drive-over conveyors of FIG. 12.

The portable drive-over conveyor 1 may be operated in a system S (see for example FIG. 12) formed by a plurality of such drive-over conveyors, where a pair of the drive-over conveyors is shown in the illustrated arrangement. This system is operable to perform unloading of one or more trucks each with multiple discharges. Specifically, in the illustrated arrangement a truck having two discharges may be unloaded at each one of its multiple discharges, that is unload points of the truck.

Turning now to the constituent drive-over conveyors of the system S, the portable drive-over conveyor 1 comprises a trailer 4 forming a base of the portable drive-over conveyor. The trailer has an overall frame structure 6 with a front end 8A, rear end 8B, and left and right sides 8C and 8D spanning between the front and rear ends. The trailer thus comprises a trailer axis T with the front and rear ends 8A, 8B being longitudinally spaced apart along the trailer axis T and the left and right sides 8C, 8D of the trailer extending longitudinally of the trailer axis T.

Figure 1:
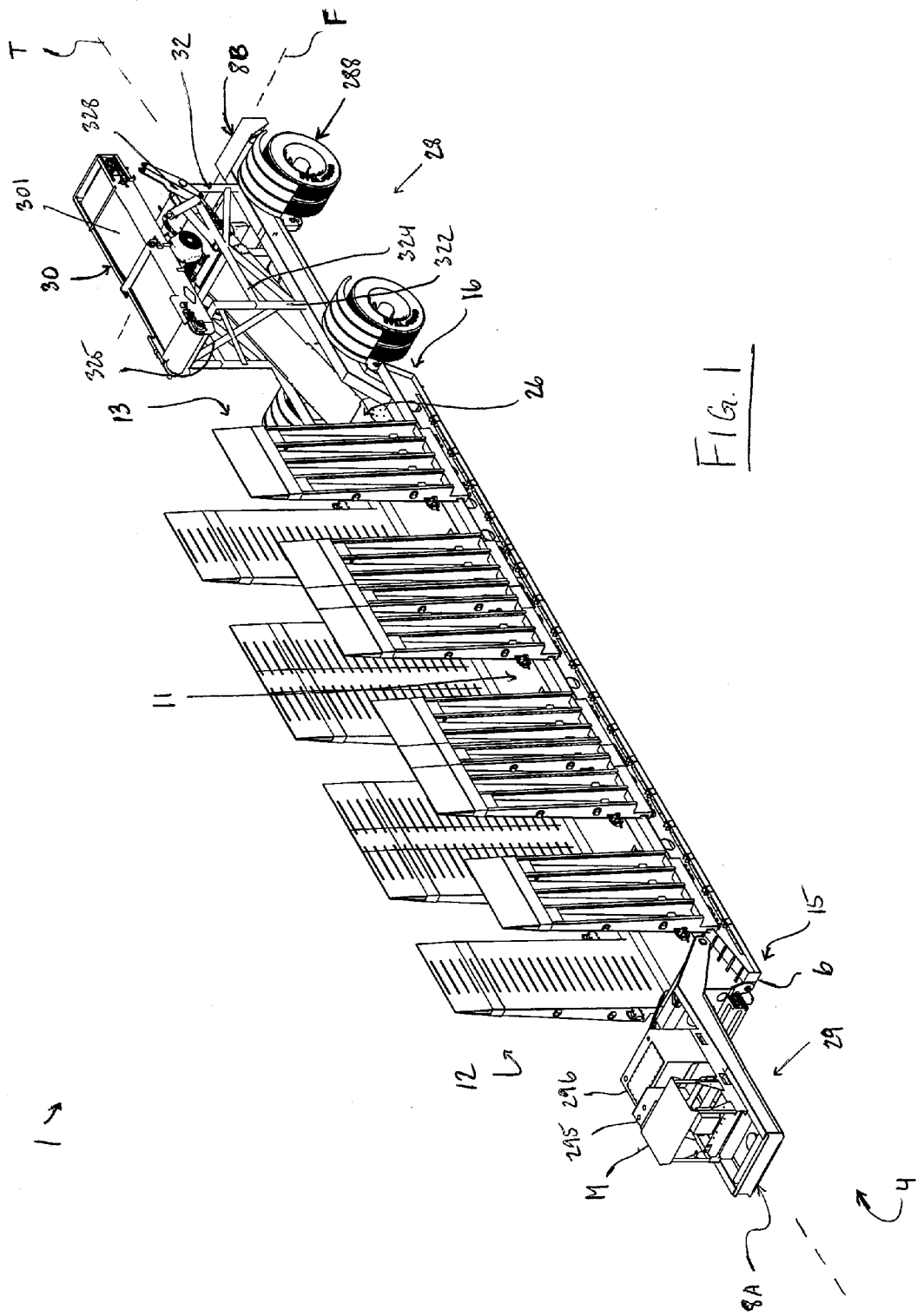
FIG. 1 is an isometric view of a portable drive-over conveyor according to the present invention that shows the portable drive-over conveyor in a transport position with some components omitted for clarity of illustration.
Figure 2:
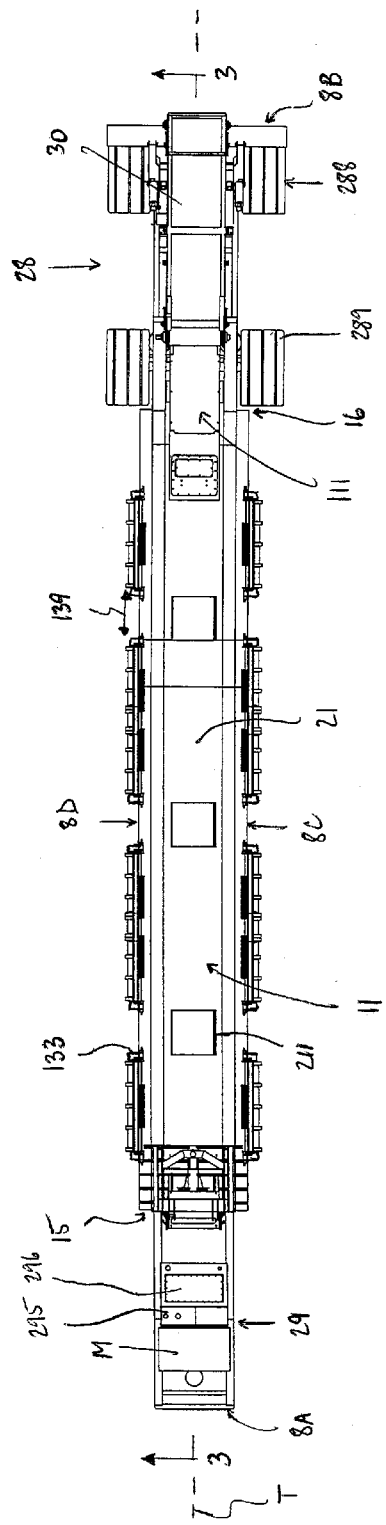
FIG. 2 is a top plan view of the portable drive-over conveyor of FIG. 1.
Figure 3:
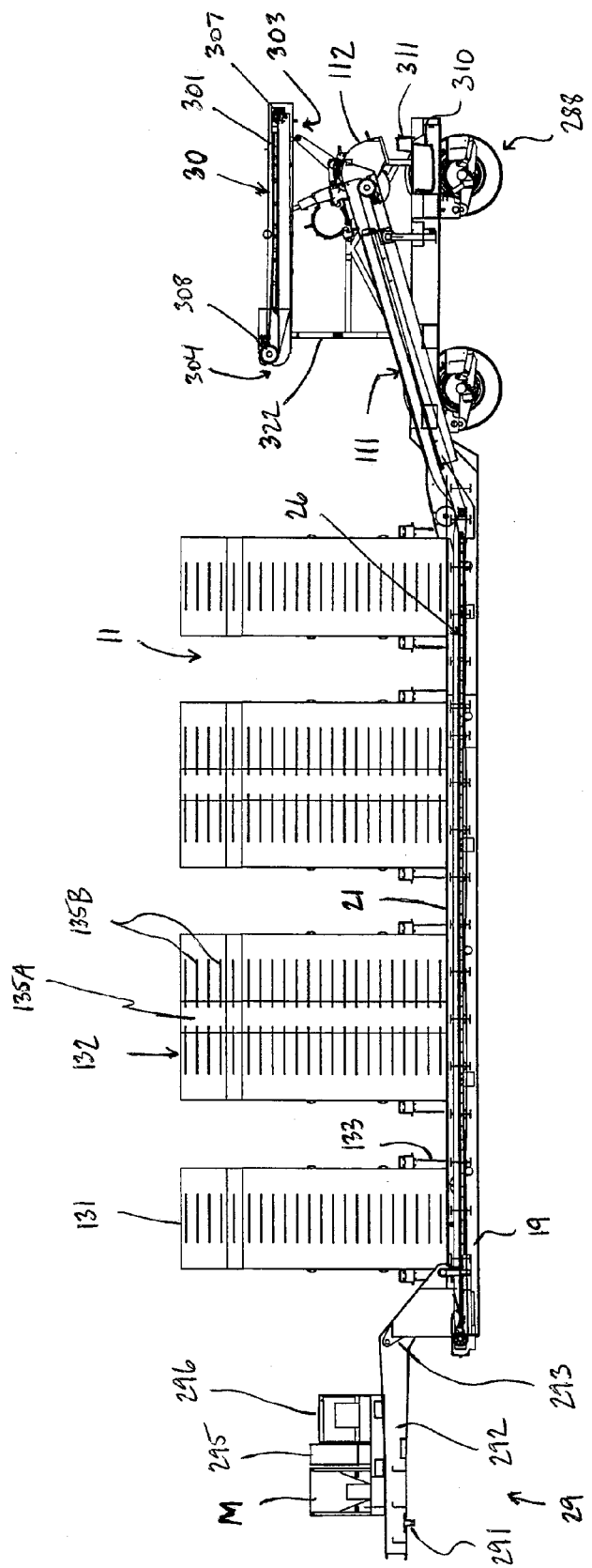
FIG. 3 is a cross-sectional view along line 3-3 in FIG. 2.
Figure 4:
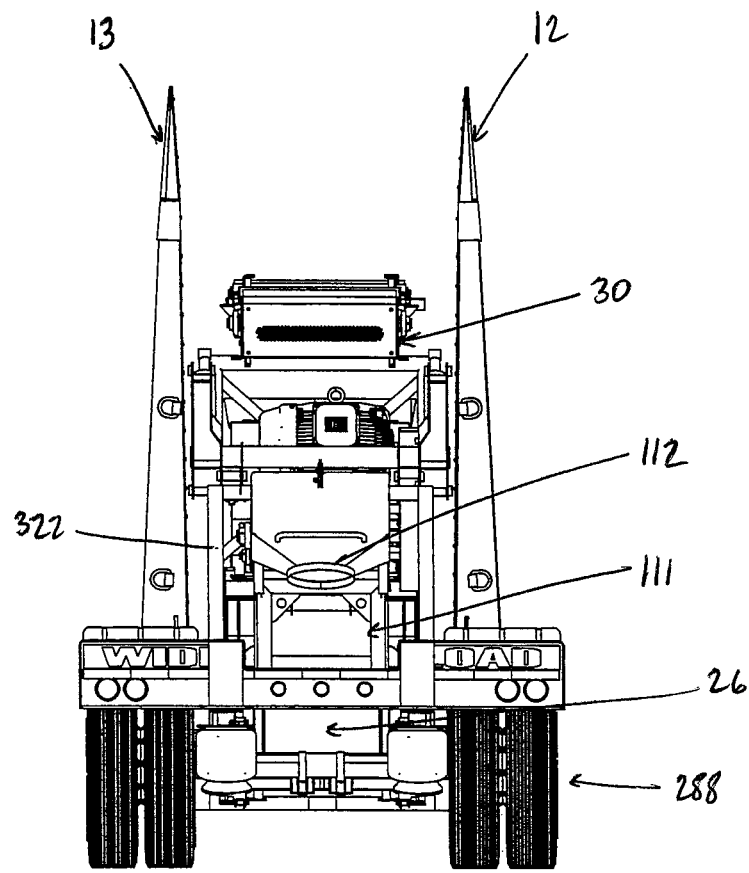
FIG. 4 is a rear elevational view of the portable drive-over conveyor of FIG. 1.
Figure 6:
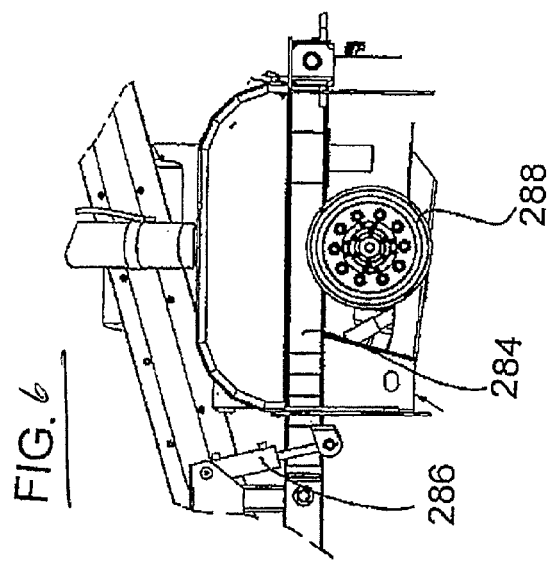
FIG. 6 is part only of the vertical central cross sectional view of FIG. 4 on an enlarged scale showing rear frame and ground wheels.

The front end, rear end, and left and right sides 8A-8D collectively define a periphery of a frame of the trailer which is more clearly shown in top plan view in FIG. 2. It will be appreciated that an overall width of the trailer 4 is non-uniform along its length from front 8A to rear 8B, such that the periphery may not be a regularly shaped polygon, as for example a rectangle, but instead may be irregularly shaped so as register with those features of the portable drive-over conveyor which extend transversely from the central trailer axis T at different distances therefrom. Furthermore, the periphery of the trailer may be considered to vary in shape from one position of ramp assemblies 12, 13 to the next as will become apparent shortly.

The arrangement shown herein includes a center frame structure 11, a first ramp assembly 12 on one side, and a second ramp assembly 13 on the second side so that the truck to be unloaded can drive over the portable drive-over conveyor entering from one ramp, halting with a discharge of the truck at the center section and then departing over the second ramp.

Figure 8:
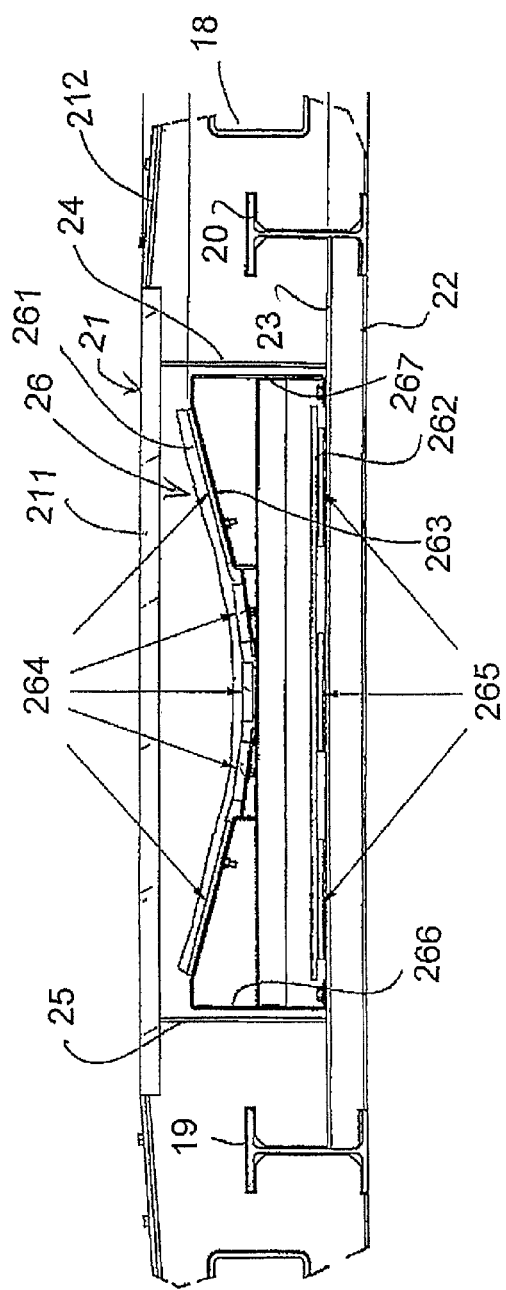
FIG. 8 is part only of the cross sectional view of FIG. 5 on an enlarged scale showing the conveyor.
Figure 11:
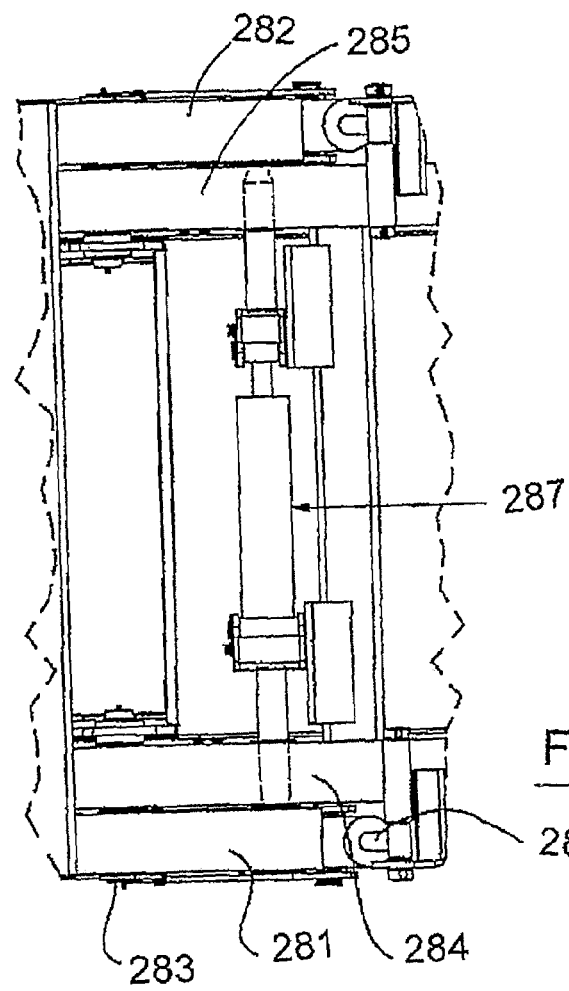
FIG. 11 is a side view of a part only of the rear section of FIG. 9.
Figure 10:
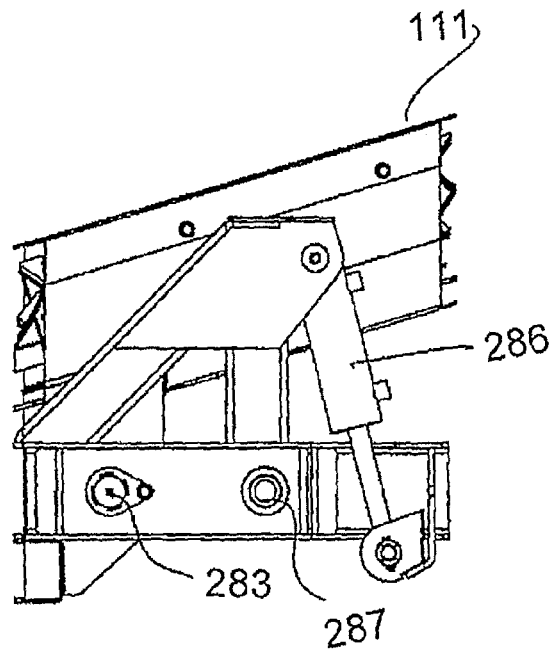
FIG. 10 is a plan view of a part only of the rear section of FIG. 9.

The center frame structure 11 has a forward end 15, a rearward end 16 and first and second sides 17, 18. The center frame structure includes a pair of longitudinal beams 19, 20 forming the main structural components, an upper support surface 21 and a bottom cover panel 22. The panel 22 sits on the ground during operation and the beams support the top surface 21 on a transverse wall 23 and upstanding walls 24, 25 (FIG. 8). The top support surface 21 extends along the full length of the center section.

The first and second ramp assemblies 12, 13 are symmetrically mounted on the respective side 18 for pivotal movement about an axis 181 longitudinal of the first side 18 (or second side 17) from a raised position standing vertically upwardly above the first side 18 for transport of the portable drive-over conveyor from place to place. When delivered to a required location, the ram assemblies are lowered to an operating position extending outwardly from the respective side as shown in the Figures to define a ramp allowing a truck wheel to move from the ground onto the center frame structure for the delivery process.

Each ramp assembly comprises a plurality of side by side parallel ramp members 131 and 132 which can be raised and lowered by cylinders 133 (shown schematically) at sides of the ramps.

Each ramp includes an inclined upper surface 135 attached at its edges to two triangular sides 137 which attach also to a bottom wall 136 which sits on the ground and transfers loads from the vehicle to the ground from the upper surface 135. The upper surface and the bottom surface converge to an edge 138 at the outer end of the ramp which is sufficiently sharp to allow the vehicle wheel to enter onto the ramp without the necessity for an earthen ramp beyond the edge 138. The ramps and the center frame structure thus provide upper surfaces for supporting the truck as it passes from the first ramp over the center frame structure and onto the second ramp. The ramps 131, 132 are spaced along the side edges of the center section by a space 139 so that any material from the vehicle which does not enter onto the center section for conveying falls to the ground rather than is collected on the ramps.

A first conveyor 26 is arranged to extend along the center frame structure 11 and arranged to transport the particulate material longitudinally along the center frame structure 11 up an inclined section 111 of the first conveyor to a discharge chute 112 at one end of the center frame structure which is at a rear frame 28 at the rear end 16. The center frame structure 11 and rear frame 28 collectively define part of the overall frame structure 6 of the trailer.

The upper surface 21 of the center frame structure 11 has a plurality of central rectangular openings 211 defining inlets of the first conveyor for passage of the particulate material discharged over the respective inlet opening through the upper surface to the conveyor 26. Each inlet is spaced from the side edges of the upper surface and from the ramps and forms a relatively localized area within the upper surface. Thus, the first conveyor's inlet is located between the left and right sides 8C, 8D of the overall frame structure.

Each inlet opening is substantially equal in width to the space 139 between the pair of the ramp members arranged to straddle that inlet opening in front thereof and to the rear thereof so that lifting of the ramps to the raised position does not cause any material to fall from the ramps into the inlet opening.

In the illustrated arrangement the ramp members which are immediately adjacent to one another but belonging to different pairs are formed into a unitary ramp. That is, the adjacent ramp members of different pairs are arranged to share a common edge portion 135A to one side of traction protrusions 135B which provide grip to truck wheels traversing the ramp. Thus, these adjacent ramp members move together from the raised position to the operating position thereby reducing the number of drive members for example cylinder 133 that are required to actuate this movement of the ramp assemblies.

Furthermore, each inlet 211 of the first conveyor comprises a funnel structure 2111 which is independent of the upper surface 21 such that the funnel structure is movable relative thereto. That is, with an open top of the funnel structure 2111 defining the inlet opening 211 and a neck 2113 extending downwardly from a bottom opening of the funnel structure so as to guide the particulate material discharged from the trucks onto the first conveyor 26, the funnel structure is arranged for raising above the upper surface of the center frame structure using a hydraulic actuating arrangement, for example hydraulic cylinders. As such, the funnel structure may be raised upwardly towards the respective discharge of the truck so as to the position the inlet 211 closer to the truck discharge for capturing as close to all of the particulate material discharged therefrom.

The center structure 11 has at the front edge 15 a frame component 29 attached to the center frame structure at the forward end so as to extend forwardly therefrom and includes a planar platform 292 generally parallel to the center frame structure at a height raised from the center frame structure. The platform 292 is attached to the center structure by a frame connection which is designed to transfer loads during transport from the center section to the platform so that the platform is cantilevered forwardly from the center frame structure 11. The free end of the platform, opposite to that end which is attached to the center frame structure, thus defines the front end 8A of the trailer's overall frame structure. Furthermore, the platform carries drive components including a motor arrangement M together with hydraulic drive systems and control units 295, 296 for conveyors of the portable drive-over conveyor 1.

Underneath the platform is provided a king pin 291 depending from an underside of the frame for engaging a towing platform of a highway tractor (not shown). As such, the king pin together with the platform define a hitch coupling of the trailer 4.

Figure 5:
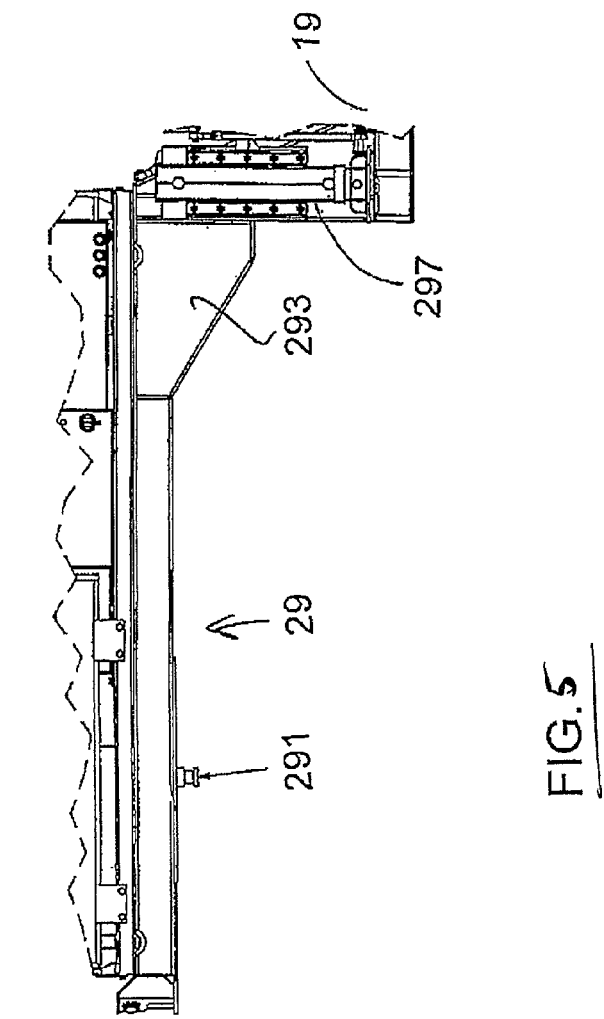
FIG. 5 is a part only of the vertical central cross sectional view of FIG. 4 on an enlarged scale showing the front platform.

As more clearly shown in FIG. 5, the frame platform at the frame 293 connecting to the center section carries conventional jacking legs used on semi-trailers to jack to the ground. The legs which can be moved from a raised position in which the center frame structure rests on the ground to a lowered position in which feet of the legs sit on the ground and lift the center frame structure to be raised from the ground and the towing platform of a highway tractor, defining a towing vehicle, can move underneath the king pin.

The rear frame structure 28 extends rearwardly from the center frame structure at a position thereon raised from a bottom of the center frame structure and carries the upwardly and rearwardly extending portion 111 of the conveyor 11. The rear frame includes a pair of parallel beams 281, 282 connected at a forward end to a frame coupling to the center section to transfer loads therebetween. An inner frame defined by parallel beams 284, 285 located inside the beams 281, 282 is pivotal relative to the outer frame on a transverse pivot pin. The inner frame is pivotal by a drive cylinder 286 and can be locked in a lowered position for transport by a locking pin 297 which drives a pin across aligned holes of the beams. The inner frame carries a plurality of wheel and axle assemblies 288 for movement relative to the center frame structure and the outer rear frame from a lowered road position to a raised position allowing the center frame structure 11 to rest on the ground. The wheel and axle assembly includes highway tires and a gas bag suspension of the relative to the inner frame which is arranged for highway travel. As such, wheels 289 are rotatably coupled to the overall frame structure 6 such that the trailer is towable across a support surface or roadway by the towing vehicle, such as the highway tractor.

Each of the ramp assemblies tapers to the outer ramp edge 138 and a length between the outer ramp edge 138 of the first pair of ramps and the other ramps is at least 25 feet and preferably of the order of 28 feet which combined with a height of the center structure from the ground to the upper surface which is of the order of or less than 12 inches allows conventional belly discharge highway semi-trailers to pass over without grounding out and without requirement for any earthen ramp beyond the edges 138.

Figure 7:
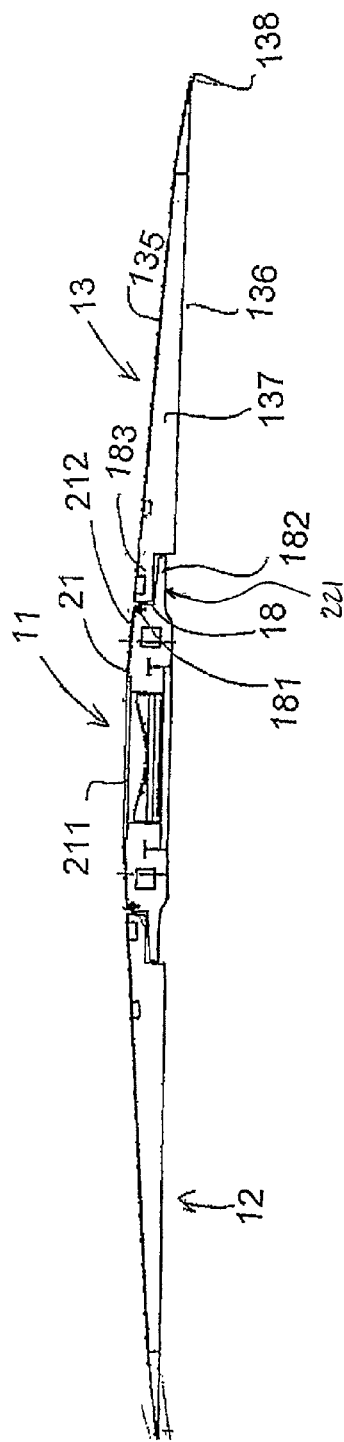
FIG. 7 is transverse cross sectional view of the embodiment of FIG. 1.

As shown in FIG. 7, the center frame structure 11 includes for each ramp assembly 12, 13 an outwardly extending shoulder 182 on which the inner edge 183 of the respective ramp assembly sits. This acts to transfer loads form the ramp as the truck passes over from the ramp to the center structure and to reduce loading on the pivot at the axis 181.

As shown in FIG. 8, the conveyor 26 includes a belt 261 which has an upper run underneath the inlet opening 211 which sits on a downwardly concave support surface 263 carried by the center frame structure at the transverse sheet 23 of the beams 19, 20. The support surface 263 carries a plurality of stationary strips 264 of a plastics bearing material on which the upper run of the belt slides. This allows the belt to slide effectively and avoids the increase in height that would in incurred if rollers were used. The concave shape of the belt and support provides space for the sand to enter and be carried on the belt while again avoiding an increase in height of the center section. The return run 262 of the belt slides on a bottom support surface defined by the sheet 23 on which is provided a plurality of stationary strips 265 of the plastics bearing material. The support sheet 263 is carried on upstanding side sheets 266, 267 carried on the sheet 23.

Thus, in summary of a first portion of the portable drive-over conveyor 1, the portable drive-over conveyor includes the trailer 4 to be towed as a highway semi-trailer. The portable drive-over conveyor 1 includes the center frame structure 11 containing a conveyor belt, defined by the first conveyor 26, with two pivotal ramps on each side to be moved to a raised position standing upwardly and a lowered position extending outwardly. The ramps have sufficient length and the center structure has a low height to allow a highway semi-trailer to pass over an inlet opening in the center structure. A platform is attached at the forward end with a king pin on the underside for engaging a towing platform of a highway tractor. Wheel and axle assemblies including suspension of the axles for highway travel is mounted on a sub-frame pivotal relative to main rear frame for movement relative to the center frame structure from a lowered road position to a raised position allowing the center frame structure to rest on the ground.

There is provided a second conveyor 30 additionally to the first conveyor 26 that is swivably attachable to the frame 6 of the trailer 4 so as to be swivably movable about an upstanding axis U at the rear 8B of the trailer for discharging the particulate material from the portable drive-over conveyor to a preselected location beyond the conveyor 1 on either side of the trailer axis T.

The second conveyor thus comprises a separate length of conveyor belt 301 and its own inlet 303 and discharge 304 that are separate of the first conveyor. However, the first and second conveyors are cooperated such that the first conveyor 26 transfers particulate material from the plurality of inlets 211 to its discharge 112 located at an intermediary location IL spaced rearwardly of a rearmost one of the inlets, where an inlet 303 of the second conveyor is positionable beneath the first conveyor discharge 112 and the second conveyor may be fed so as to transfer the particulate material to its discharge 304 positionable beyond the periphery of the trailer.

It will thus be appreciated that the first conveyor 26 and the second conveyor 30 may be regarded as collectively defining a single conveyor having a first conveyor portion defined by the first conveyor and a second conveyor portion defined by the second conveyor. The first conveyor portion extends from a rearmost one of the inlets at the rearward end 16 of the center frame structure to the intermediary location with respect to the collective single conveyor, and the second conveyor portion thus extends from the intermediary location IL which is forward of the rear end 8B of the trailer to the discharge 304 of the collective single conveyor.

In the illustrated arrangement the second conveyor comprises a conventional type conveyor belt 301 supported on conventional rollers 307, 308 carried at inlet and discharge ends of the second conveyor. One of these rollers may be a drive roller and the other may be an idler. There are also provided a number of belt guide members for guiding the conveyor belt along an appropriate bath between the end rollers.

An outer body of the second conveyor may have an opening in the top of the outer body at the inlet end so as to form the inlet 303 of the second conveyor. The discharge 112 of the first conveyor thus positioned over top of the second conveyor's inlet 303 may then readily feed the second conveyor.

The swiveling movement of the second conveyor is afforded by for example a rotatable base 310 carried at the intermediary location with upstanding coupling ears at diametrically opposite locations on the rotatable base for removably connecting to the second conveyor. The rotatable base may also include ports 311 (shown schematically) which supply to the intermediary location IL for use by the second conveyor the power from the motor arrangement M. Additionally, the second conveyor is also inclined so as to extend upwardly and there also may be provided an upright hydraulic arm 312 (shown schematically) pivotally mounted to the rotatable base at a fixed location thereon and to a bottom of the second conveyor for raising and lowering the second conveyor relative to the horizontal or the trailer axis T.

By this swiveling movement the second conveyor may be used to locate angularly of the trailer 4 a discharge location of the particulate material. That is, the particulate material is dischargeable by the second conveyor at different locations angularly of the trailer axis T in a horizontal plane containing the trailer axis.

As the second conveyor may extend considerably beyond the periphery of the trailer in a working position where the second conveyor is arranged to discharge the particulate material in a manner completing the unloading operation, the second conveyor 30 is movable into a transport position where the second conveyor portion lies within the periphery of the trailer so as to be better suited for transportation.

In the transport position, the second conveyor 30 is supported in horizontal orientation above the inclined section 111 of the first conveyor on a framework 32 which thus forms a rack. The framework comprises upstanding members 322 supported on the rear frame 28 and horizontally extending cross-members 324, 325 for bracing the rack. Furthermore, the rack and outer body of the second conveyor include cooperative fasteners for securing the second conveyor to the rack framework in the transport position of the second conveyor. The rack may also be removable so as to not interfere with the swiveling movement of the second conveyor during operation in the working position.

The second conveyor may be movable between the transport position and the working position by hydraulic arms pivotal about a horizontal folding axis F which is transverse to the trailer axis T. Hydraulic arms 328 effecting this pivotal movement between the transport and working position may be provided on the rack framework 32, for example pivotally attached to one of an upstanding member 322 and a cross-member 324, to move the second conveyor from its horizontal orientation in the transport position to its inclined orientation extending from the rotatable base 310. Once the second conveyor is secured in the rotatable base, the hydraulic arms 328 may be detached and removed from the trailer together with the framework so as to not impede the swiveling movement of the second conveyor. In the figures where shown the hydraulic arms 328 are illustrated in a ready position but detached from the second conveyor.

As such, the portable drive-over conveyor 1 may by itself be operated so as to unload two or more trucks side by side. The second conveyor may be swiveled about the upstanding axis U so as to control a location where the particulate material is discharged by the drive-over conveyor.

The portable drive-over conveyor 1 may also be operated in conjunction with another such drive-over conveyor to operate in parallel to unload one or more trucks having multiple discharges.

In this parallel operation, the pair of portable drive-over conveyors are arranged side by side in spaced parallel relation such that one of the sides 17 (or 18) of a first one of the portable drive-over conveyors is facing one of the sides of a second one of the portable drive-over conveyors. Typically, the drive-over conveyor are spaced apart so that a distance between their inlets 211 is in the order of spacing between the discharges of the truck.

One of the ramp assemblies 12 (or 13) of each portable drive-over conveyor is then positioned in an overlapping configuration with one ramp assembly disposed on top of the other so as to form a bridge B allowing a truck wheel to cross from the center frame structure 11 of one portable drive-over conveyor to the other.

Thus, a truck may move from a surface such as the ground or a roadway onto one of the ramp assemblies of the first drive-over conveyor and pass over its center frame structure 11 across the bridge B and over the center frame structure of the second drive-over conveyor and down onto the ramp assembly on the other side of the second drive-over conveyor thereby positioning two unload points of the truck over one inlet of each portable drive-over conveyor for discharging the particulate material to the conveyors.

Depending on the distance between the two drive-over conveyors, the overlapping ramp assemblies may define a bridge which is rectangular in cross-section where the bottom wall 136 of the upper ramp member 131U lies flush against the upper surface 135 of the lower ramp member 131L. The truck wheel thus only engages one of the ramp members as the truck crosses the bridge B. However, it will be appreciated that in the overlapping configuration the ramp members may define in cross-section of the bridge another polygon where the upper surface 135 of the ramp member of each drive-over conveyor defines an upper crossing surface of the bridge B between the center frame structures 11.

Thus, in the illustrated arrangement the upper ramp member 131U is rested on the lower ramp member 131L which is resting on the ground. This may reduce stress on the pivotal axis 181 about which the ramp assemblies move from the raised position to the operating position when the truck crosses the bridge.

Furthermore, depending on a steepness of the ramp members the lower ramp member in the overlapping configuration may extend to a position beneath the center frame structure 11 of the other drive-over conveyor. A bottom 22 of the center frame structure which is facing the ground may be shaped for example with a cut-out 221 so as to accommodate this ramp member in this position.

To further complement the parallel use, the second conveyors of the pair of drive-over conveyors may be positioned so as to discharge their particulate material to a common location, such as the illustrated hopper bin H, from which the particulate material may be conveyed to another location further downstream of the direct unloading operation performed by the drive-over conveyors. Thus, the second conveyors may be angled from their respective trailer axes T towards one another so as to discharge to the common location. This is afforded by the swiveling movement of the second conveyors about their upstanding axes U.

The second conveyors may also be arranged by positioning in the appropriate angular orientation for discharging the contents of a single truck to different locations.

Additionally, it will be appreciated that in other arrangement there may be a different number of wheel and axle assemblies, for example three. The particular number of wheel and axle assemblies used from one arrangement to another may vary depending on a net dry weight of the portable drive-over conveyor.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A method for unloading particulate material from trucks having a plurality of discharges at longitudinally spaced positions therealong comprising:
   providing at least two portable drive-over conveyors respectively comprising:
      a trailer including a center frame structure with forward and rearward ends and first and second sides;
      the trailer including a hitch coupling arranged at the forward end of the center frame structure for coupling to a towing vehicle;
      the trailer including a wheel and axle assembly arranged at the rearward end such that the trailer is towable across a support surface by the towing vehicle;
      a first ramp assembly mounted on the first side for pivotal movement about an axis longitudinal of the first side such that the first ramp assembly is positionable in a manner extending outwardly from the first side to define a ramp allowing a truck wheel to move onto the center frame structure from another surface;
      a second ramp assembly mounted on the second side for pivotal movement about an axis longitudinal of the second side such that the second ramp assembly is positionable in a manner extending outwardly from the second side to define a ramp allowing a truck wheel to move onto the center frame structure from another surface;
      a conveyor arranged along the center frame structure and arranged to transport the particulate material longitudinally along the trailer to a discharge at one end of the center frame structure;
      the ramp assemblies and the center frame structure providing upper surfaces for supporting the truck as it passes from the first ramp assembly over the center frame structure and onto the second ramp assembly;
      the upper surface of the center frame structure having an inlet for passage of the particulate material discharged thereon through the upper surface to the conveyor;
   arranging said at least two portable drive-over conveyors such that one of the sides of a first one of the portable drive-over conveyors is facing one of the sides of a second one of the portable drive-over conveyors;
   positioning one of the ramp assemblies of each of the portable drive-over conveyors in an overlapping configuration with one ramp assembly disposed on top of the other so as to form a bridge allowing a truck wheel to cross from the center frame structure of one portable drive-over conveyor to the other;
   arranging a truck to pass over said at least two portable drive-over conveyors such that respective discharges of the truck are arranged over the inlet of each portable drive-over conveyor for discharging the particulate material to the conveyors;
   and transporting the particulate material along the conveyors to another location beyond the portable drive-over conveyors.

2. The method according to claim 1 wherein the portable drive-over conveyors are arranged spaced apart so that a distance between their inlets is in the order of spacing between the discharges of the truck.

3. The method according to claim 1 wherein the inlet of at least one of the portable drive-over conveyors includes a funnel structure and a neck extending downwardly from a bottom of the funnel structure such that the funnel structure is arranged for raising above the upper surface of the center frame structure towards the respective discharge of the truck located thereover.

4. The method according to claim 1 wherein the conveyor of at least one of the portable drive-over conveyors includes a first portion extending longitudinally of the trailer from the inlet to an intermediary location spaced rearwardly of the inlet and a second portion extending from the intermediary location to the discharge of the conveyor that is located beyond the trailer.

5. The method according to claim 4 wherein the second portion is arranged for swiveling movement about an upstanding axis such that the discharge of the conveyor is positionable to either side of a central axis longitudinal of the trailer.

6. The method according to claim 4 wherein the second portion is positionable from a working position locating the discharge of the conveyor beyond the trailer to a transport position where the second portion lies within a perimeter of the trailer.

7. The method according to claim 1 wherein the conveyors feed the particulate material directly to a common location.

8. The method according to claim 1 wherein there is provided a plurality of the inlets on the portable drive-over conveyors so that a plurality of trucks are unloadable in parallel.

9. The method according to claim 1 wherein the truck is a belly dump truck.

10. A portable drive-over conveyor for unloading particulate material from trucks comprising:
   a trailer having a frame structure with front and rear ends opposite one another on a trailer axis and first and second sides spanning between the forward and rear ends longitudinally of said trailer axis where the front end, rear end, first side, and second side collectively define a periphery of the frame structure;
   the trailer including a hitch coupling supported at the front end of the frame structure for coupling to a towing vehicle;

the trailer including a plurality of wheels rotatably coupled at the rear end of the frame structure such that the trailer is towable across a support surface by the towing vehicle;

a conveyor carried by the frame structure and operable to convey particulate material along the trailer;

a first ramp assembly mounted on the first side for pivotal movement about an axis longitudinal of the first side such that the first ramp assembly is positionable in a manner extending outwardly from the first side to define a ramp allowing a truck wheel to move onto the frame structure from another surface;

a second ramp assembly mounted on the second side for pivotal movement about an axis longitudinal of the second side such that the second ramp assembly is positionable in a manner extending outwardly from the second side to define a ramp allowing a truck wheel to move onto the frame structure from another surface;

the ramp assemblies and the frame structure providing upper surfaces for supporting the truck as it passes from the first ramp assembly over the frame structure and onto the second ramp assembly;

the upper surface of the frame structure including at least one inlet for passage of the particulate material discharged thereon through the upper surface to the conveyor;

the conveyor including a first conveyor portion comprising a belt conveyor which is operable to convey the particulate material longitudinally of the trailer axis from said at least one inlet to an intermediary location disposed closer to one end of the trailer than to the other;

the conveyor further including a second conveyor portion operable to receive at the intermediary location the particulate material conveyed by the first conveyor portion and to discharge the particulate material at a location outside the periphery of the frame structure from a conveyor discharge of the conveyor defined by one end of the second conveyor portion;

the second conveyor portion being movable relative to the frame structure in pivotal movement about a substantially horizontal axis which substantially longitudinally coincides with the intermediary location between a working position in which the second conveyor portion is located beneath the first conveyor portion at the intermediary location to receive the particulate material directly therefrom and extends from the intermediary location to said one end of the second conveyor portion defining the conveyor discharge which is located horizontally outside the periphery of the frame structure, and a transport position in which the second conveyor portion is disposed vertically above the first conveyor portion so as to be unable to receive the particulate material from the first conveyor portion, with the second conveyor portion being oriented substantially horizontal and said one end of the second conveyor portion defining the conveyor discharge being located within the periphery of the frame structure, so as to be suited for towing by the towing vehicle across the support surface.

11. The portable drive-over conveyor according to claim 10 wherein the second conveyor portion disposed in the working position is swivably supported on the frame structure so as to be swivably movable about an upstanding axis such that the discharge of the conveyor is locatable to either side of the trailer axis.

12. The portable drive-over conveyor according to claim 10 wherein said at least one inlet comprises a plurality of inlets at longitudinally spaced positions of the frame structure.

13. The portable drive-over conveyor according to claim 12 wherein the ramp assemblies each include a pair of ramp members arranged one in front of and another to the rear of a respective one of the inlets such that respective ones of the pair of ramp members are in longitudinally spaced relation to one another, a respective one of the ramp members intermediate an adjacent pair of the inlets being common to the pair of ramp members corresponding to a first one of the adjacent pair of the inlets and the pair of ramp members corresponding to a second one of the adjacent pair of the inlets.

* * * * *